United States Patent
Koenig et al.

(10) Patent No.: US 9,893,584 B2
(45) Date of Patent: Feb. 13, 2018

(54) END WINDING SUPPORT FOR AN ELECTRIC GENERATOR

(71) Applicant: Hamilton Sundstrand Corporation, Charlotte, NC (US)

(72) Inventors: Andreas C. Koenig, Rockford, IL (US); Mark J. Franklin, Janesville, WI (US); David Pfaffinger, Hampshire, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 352 days.

(21) Appl. No.: 14/748,857

(22) Filed: Jun. 24, 2015

(65) Prior Publication Data
US 2016/0380501 A1    Dec. 29, 2016

(51) Int. Cl.
*H02K 3/38*   (2006.01)
*H02K 3/52*   (2006.01)
*H02K 15/08*  (2006.01)
*H02K 1/24*   (2006.01)

(52) U.S. Cl.
CPC ............ *H02K 3/38* (2013.01); *H02K 3/527* (2013.01); *H02K 15/08* (2013.01); *H02K 1/24* (2013.01); *H02K 2213/03* (2013.01)

(58) Field of Classification Search
CPC .......... H02K 3/38; H02K 3/527; H02K 15/08
See application file for complete search history.

(56) References Cited

U.S. PATENT DOCUMENTS

| | | | | |
|---|---|---|---|---|
| 3,590,301 A | * | 6/1971 | Woydt | H02K 3/527 310/208 |
| 4,486,676 A | * | 12/1984 | Moore | H02K 3/24 310/214 |
| 4,562,641 A | * | 1/1986 | Mosher | H02K 1/24 29/598 |
| 4,583,696 A | * | 4/1986 | Mosher | H02K 3/18 242/602.1 |
| 4,603,274 A | * | 7/1986 | Mosher | H02K 3/18 310/179 |
| 5,144,182 A | * | 9/1992 | Lemmer | H01R 39/08 310/194 |
| 5,177,390 A | * | 1/1993 | Van Maaren | H02K 3/20 310/183 |
| 5,298,823 A | * | 3/1994 | Johnsen | H02K 3/527 310/194 |

(Continued)

OTHER PUBLICATIONS

EP Application No. 16175945.1 Extended European Search Report dated Dec. 12, 2016, 9 pages.

*Primary Examiner* — Robert W Horn
(74) *Attorney, Agent, or Firm* — Cantor Colburn LLP

(57) ABSTRACT

An end winding support for an electric generator includes a pair of winding lead supports formed on opposite sides of a winding slot and separated by an upper slot width. Each of the winding lead supports includes a winding channel routed between a lead coupling port and the winding slot. The winding slot includes a base support and a pair of alignment members that define a transition between the base support and the winding lead supports. A lower slot width is defined along the base support between the alignment members and a ratio of the upper slot width to the lower slot width is between 1.024 and 1.053.

17 Claims, 6 Drawing Sheets

(56) References Cited

U.S. PATENT DOCUMENTS

| | | | | |
|---|---|---|---|---|
| 5,519,272 A * | 5/1996 | Christofi | | H02K 3/527 |
| | | | | 310/194 |
| 5,831,367 A * | 11/1998 | Fei | | H02K 1/246 |
| | | | | 310/162 |
| 6,437,476 B1 * | 8/2002 | Nygard | | H02K 3/18 |
| | | | | 310/195 |
| 6,483,220 B1 * | 11/2002 | Johnsen | | H02K 3/18 |
| | | | | 310/179 |
| 6,590,311 B1 * | 7/2003 | Wang | | H02K 1/24 |
| | | | | 310/261.1 |
| 6,710,497 B2 * | 3/2004 | Wang | | H02K 3/527 |
| | | | | 310/208 |
| 6,844,655 B2 * | 1/2005 | Kaminski | | H02K 3/527 |
| | | | | 29/598 |
| 7,385,323 B2 * | 6/2008 | Takahashi | | H02K 3/38 |
| | | | | 310/194 |
| 9,653,958 B2 * | 5/2017 | Patel | | H02K 3/527 |
| 9,837,868 B2 * | 12/2017 | Wirsch, Jr. | | H02K 3/24 |
| 2009/0218905 A1 * | 9/2009 | Kaneiwa | | H02K 3/38 |
| | | | | 310/214 |
| 2010/0320860 A1 | 12/2010 | Patel et al. | | |
| 2014/0028141 A1 * | 1/2014 | DuVal | | H02K 3/20 |
| | | | | 310/183 |
| 2014/0368068 A1 * | 12/2014 | Birolleau | | H02K 3/527 |
| | | | | 310/66 |
| 2015/0270756 A1 * | 9/2015 | Foulsham | | H02K 3/30 |
| | | | | 310/43 |
| 2015/0349601 A1 * | 12/2015 | Mahler | | H02K 3/38 |
| | | | | 310/270 |
| 2016/0211712 A1 * | 7/2016 | Patel | | H02K 3/30 |
| 2016/0211713 A1 * | 7/2016 | Patel | | H02K 3/30 |
| 2016/0329765 A1 * | 11/2016 | Pal | | H02K 3/527 |
| 2016/0380501 A1 * | 12/2016 | Koenig | | H02K 3/527 |
| | | | | 310/194 |

* cited by examiner

END WINDING SUPPORT FOR AN ELECTRIC GENERATOR

BACKGROUND

The present invention relates to electric generators, and more particularly to winding assemblies for electric generators.

Electric generators typically include a rotor on which is produced a magnetic field that rotates within a stationary set of conductors wound in coils on an iron core, referred to as a stator. As a mechanical input caused the rotor to turn, the magnetic field cuts across the conductors and induces a current in the stator windings. Often there are three sets of stator windings, physically offset so that the rotating magnetic field produces a three phase current, displaced by one-third of a period with respect to each other.

The rotor's magnetic field may be produced by a coil of wire wound onto a iron core, where the coil is energized with direct current provided by an exciter element such as a dynamo. The coil includes multiple turns of copper wire and must be supported near the outer diameter of the rotor to keep the wire in place and prevent breakage. During most of the length of the rotor this support can be provided by the geometry of the steel core, but on the ends of the core where the wire crosses from one side to the other, an additional support piece must be provided. The additional support piece must be able to retain the coil at high temperatures and possibly in a lubricating oil environment. High rotational speeds and vibrations, for instance, when used on an aircraft, can place additional strain loads on the coil, risking reduced service life if the coil support does not adequately retain the coil.

BRIEF DESCRIPTION

According to one embodiment, an end winding support for an electric generator includes a pair of winding lead supports formed on opposite sides of a winding slot and separated by an upper slot width. Each of the winding lead supports includes a winding channel routed between a lead coupling port and the winding slot. The winding slot includes a base support and a pair of alignment members that define a transition between the base support and the winding lead supports. A lower slot width is defined along the base support between the alignment members. A ratio of the upper slot width to the lower slot width is between 1.024 and 1.053.

According to another embodiment, a main field wound assembly for an electric generator includes a rotor core assembly, a first end winding support coupled to a first end of the rotor core assembly, and a second end winding support coupled to a second end of the rotor core assembly axially aligned and opposite the first end of the rotor core assembly. The first and second end winding supports each include a pair of winding lead supports formed on opposite sides of a winding slot and separated by an upper slot width. Each of the winding lead supports includes a winding channel routed between a lead coupling port and the winding slot. The winding slot includes a base support and a pair of alignment members that define a transition between the base support and the winding lead supports. A lower slot width is defined along the base support between the alignment members, and a ratio of the upper slot width to the lower slot width is between 1.024 and 1.053. The main field wound assembly also includes a coil of wire repeatedly wound about the first end winding support, the rotor core assembly, and the second end winding support.

According to a further embodiment, a method of installing a main field wound assembly in an electric generator is provided. The main field wound assembly is inserted into a rotor assembly of the electric generator. The main field wound assembly includes a rotor core assembly, a first end winding support coupled to a first end of the rotor core assembly, and a second end winding support coupled to a second end of the rotor core assembly axially aligned and opposite the first end of the rotor core assembly. The first and second end winding supports each include a pair of winding lead supports formed on opposite sides of a winding slot and separated by an upper slot width. Each of the winding lead supports includes a winding channel routed between a lead coupling port and the winding slot. The winding slot includes a base support and a pair of alignment members that define a transition between the base support and the winding lead supports. A lower slot width is defined along the base support between the alignment members, and a ratio of the upper slot width to the lower slot width is between 1.024 and 1.053. The main field wound assembly also includes a coil of wire repeatedly wound about the first end winding support, the rotor core assembly, and the second end winding support. At least one shim is installed between the main field wound assembly and a housing of the rotor assembly.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
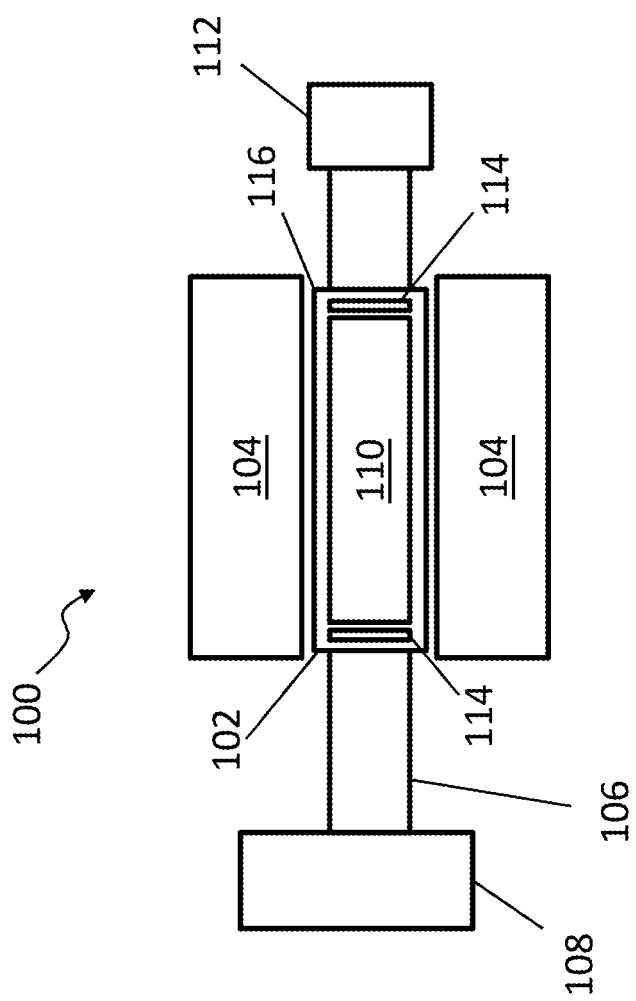
FIG. 1 is a schematic of a rotor assembly and a stator of a generator according to an embodiment.

FIG. 1 schematically illustrates a portion of an electric generator 100 that includes a rotor assembly 102 and a stator 104. The rotor assembly 102 is integrally formed with or operably coupled to a shaft 106 driven by a rotational input 108, which may be driven by an external drive. For example, the rotational input 108 can include a gearbox (e.g., driven by an aircraft engine) and/or input shaft that drives rotation of the shaft 106. The rotor assembly 102 is rotatably disposed at a radially inwardly location of the stator 104. The stator 104 includes at least one stator winding (not depicted).

The rotor assembly 102 includes a main field wound assembly 110 that can receive a rotor excitation current from a rotor excitation current source 112. The rotor excitation current source 112 may also be coupled to the shaft 106. In one embodiment, the excitation current source is a dynamo that an excitation current responsive to relative motion between coils and permanent magnets (e.g., an excitation stator, not depicted) and may include a rotating rectifier (not depicted) to condition the rotor excitation current. To secure the main field wound assembly 110 in the rotor assembly 102 during rotation, at least one shim 114 can be installed between the main field wound assembly 110 and a housing 116 of the rotor assembly 102.

Figure 2:
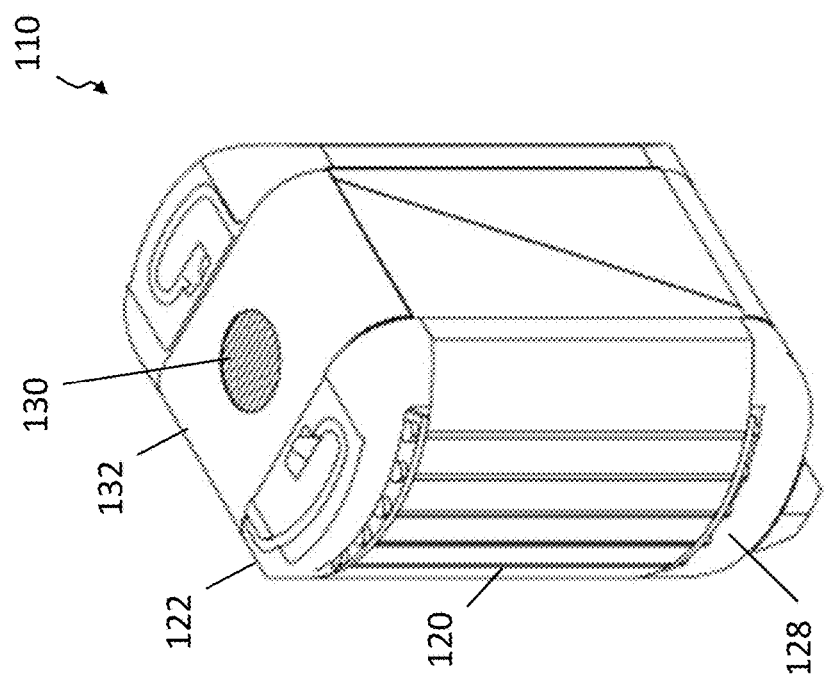
FIG. 2 is a perspective view of a main field wound assembly of the rotor assembly of FIG. 1.
Figure 3:
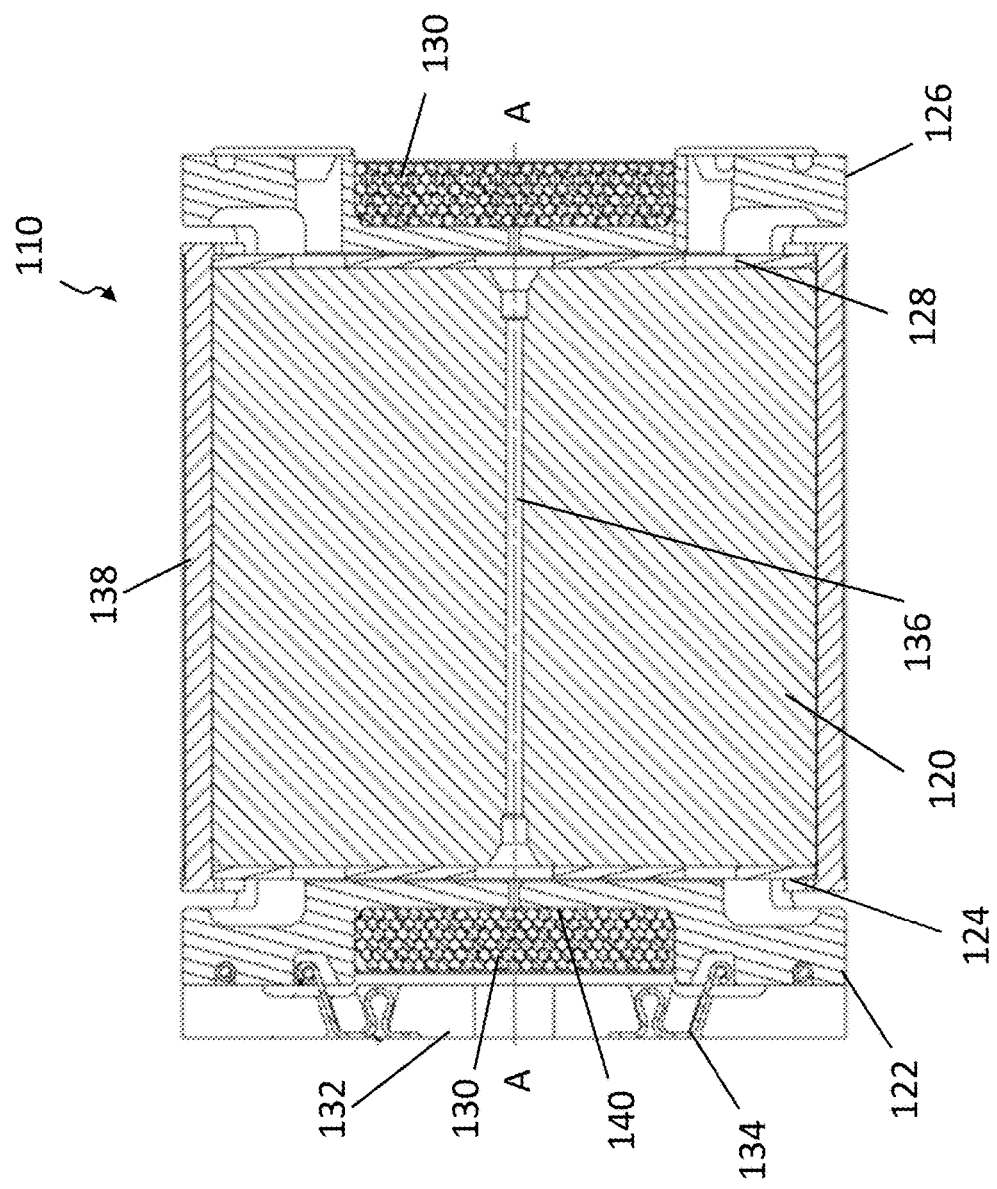
FIG. 3 is a cross-sectional view of the main field wound assembly of FIG. 2.
Figure 4:
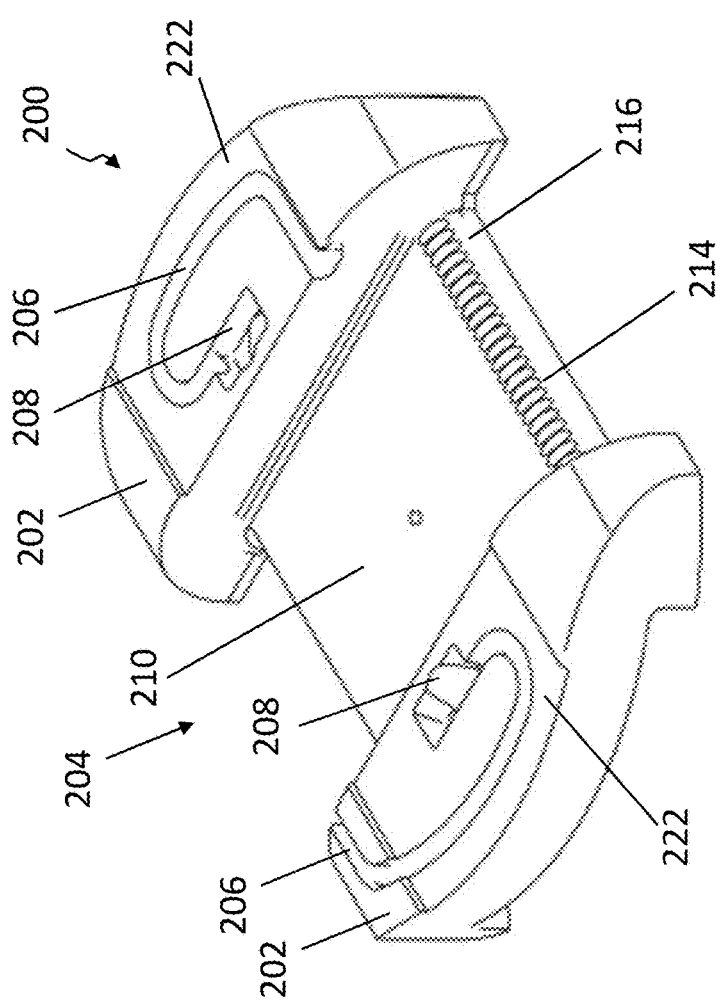
FIG. 4 is a perspective view of an end winding support of the main field wound assembly of FIG. 2.

FIG. 2 is a perspective view, and FIG. 3 is a cross-sectional view of the main field wound assembly 110 of the rotor assembly 102 of FIG. 1. According to an embodiment, the main field wound assembly 110 includes a rotor core assembly 120. A first end winding support 122 is coupled to a first end 124 of the rotor core assembly 120. A second end winding support 126 is coupled to a second end 128 of the rotor core assembly 120 axially aligned (e.g., along axis A) and opposite the first end 124 of the rotor core assembly 120. A coil of wire 130 is repeatedly wound about the first end winding support 122, the rotor core assembly 120, and the second end winding support 126. A rotor band 132 can be used to insulate the coil of wire 130 from the shaft 106 of FIG. 1. One or more spring clips 134 can be used to provide a conductive path to couple the coil of wire 130 to the rotor excitation current source 112 of FIG. 1. An orifice 136 along axis A can be used to allow coolant to flow between the first and second end winding supports 122, 126 to the rotor core assembly 120. The rotor core assembly 120 may contain amortisseur bars 138, which when connected to conductive laminations at a first end 124 and a second end 128 of the rotor core assembly 120 can be used to dampen oscillations due to speed and load fluctuations. As can be seen in FIG. 3, the coil of wire 130 may be wound in layers such that a first layer of winding 140 is closest to the rotor core assembly 120.

FIGS. 4-7 provide various views of an end winding support 200 which is an example of the first and second end winding supports 122, 126 of the main field wound assembly 110 of FIGS. 2 and 3. The illustrated end winding support 200, such as the first and second end winding supports 122, 126, includes a pair of winding lead supports 202 formed on opposite sides of a winding slot 204 and separated by an upper slot width W1 of about 1.527 inches (3.879 cm). Each of the winding lead supports 202 can include a winding channel 206 routed between a lead coupling port 208 and the winding slot 204. The winding slot 204 includes a base support 210 and a pair of alignment members 212 that define a transition between the base support 210 and the winding lead supports 202, where a lower slot width W2 of about 1.471 inches (3.736 cm) is defined along the base support 210 between the alignment members 212.

Figure 5:
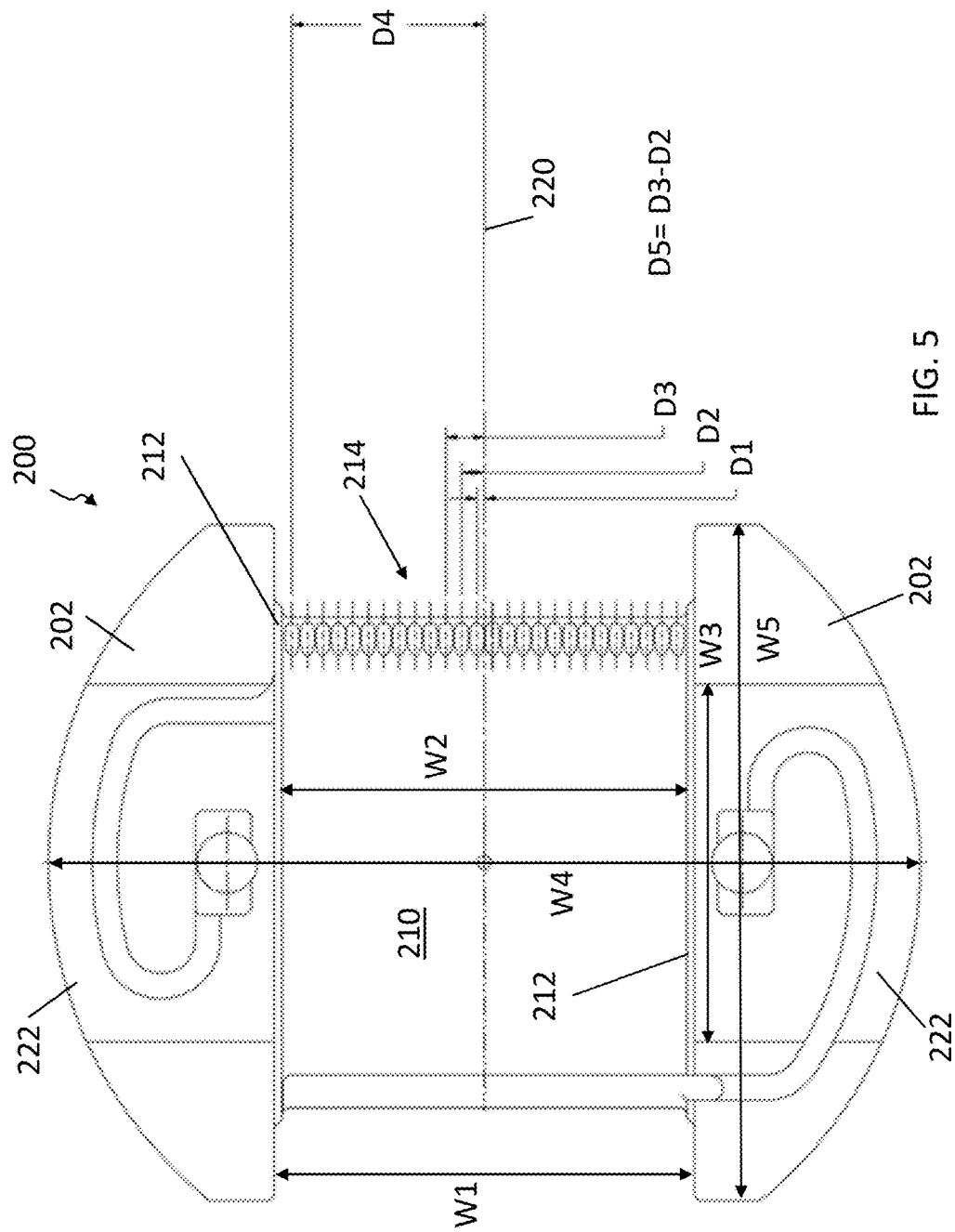
FIG. 5 is a top view of the end winding support of FIG. 4.
Figure 6:
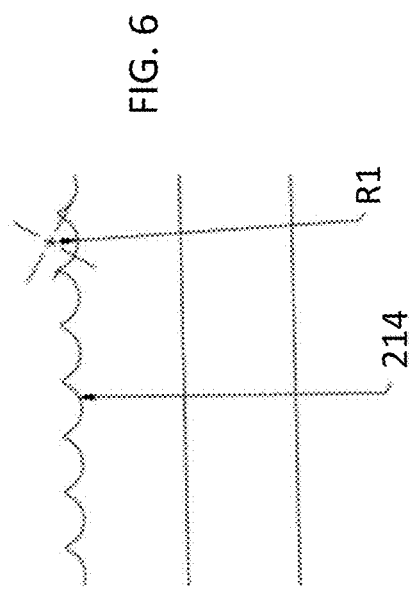
FIG. 6 is a partial view of grooves of the end winding support of FIG. 4.
Figure 7:
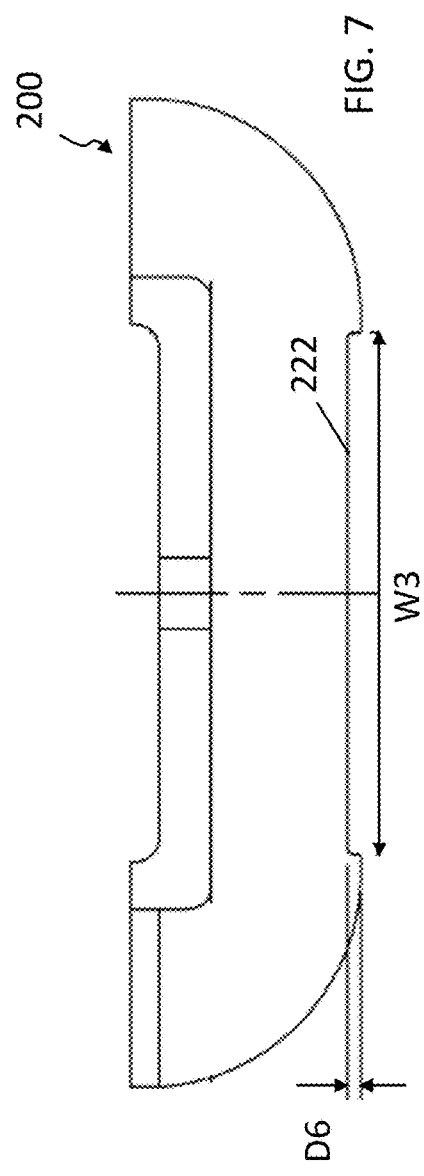
FIG. 7 is a side view of the end winding support of FIG. 4.

The base support 210, which can be part of the first and/or second end winding supports 122, 126 of FIGS. 2 and 3 may include a plurality of grooves 214 aligned along an edge 216 of the base support 210 between the winding lead supports 202. The grooves 214 establish a spacing constraint for the first layer of winding 140 of FIG. 3. In the example of FIG. 5, there are about twenty-six grooves 214 that are centered about a reference line 220, where a first pair of the grooves 214 is offset by a distance D1 of about 0.028 inches (0.0711 cm) on either side of the reference line 220. A second pair of the grooves 214 is offset from the reference line 220 by a distance D2 of about 0.084 inches (0.213 cm). A third pair of the grooves 214 is offset from the reference line 220 by a distance D3 of about 0.14 inches (0.356 cm). An Nth pair of the grooves 214 is offset from the reference line 220 by a distance D4 of about 0.7 inches (1.778 cm). A distance between each of the grooves 214 can be defined as distance D5 which equals distance D3 minus distance D2, or about 0.056 inches (0.142 cm). Each of the grooves 214 may have a radius R1 of about 0.028 inches (0.0711 cm), which substantially corresponds to a minimum radius of magnetic wire used in the coil of wire 130 of FIGS. 2 and 3.

Each of the winding lead supports 202 further includes a shim support groove 222 having a shim support width W3 of about 1.295 inches (3.289 cm) and a shim support depth D6 of about 0.033 inches (0.0838 cm). The shim support width W3 is defined orthogonal to the upper slot width W1 and the lower slot width W2. A total width W4 of the end winding support 200 is about 3.162 inches (8.031 cm). An end winding lead support width W5 is about 2.456 inches (6.238 cm).

A number of ratios may be defined with respect to the first and second end winding supports 122, 126 of the main field wound assembly 110 of FIGS. 2 and 3 as illustrated by the example of the end winding support 200 of FIGS. 4-7. In an embodiment, a ratio of the upper slot width W1 to the lower slot width W2 is between 1.024 and 1.053. A ratio of a distance D5 between each of the grooves and a radius R1 of each of the grooves can be between 1.54 and 2.66. A ratio of the shim support width W3 to the shim support depth D6 can be between 32.94 and 48.34. A ratio of the upper slot width W1 to the shim support width W3 can be between 1.16 and 1.20. A ratio of the lower slot width W2 to the shim support width W3 can be between 1.11 and 1.16. A ratio of the total width W4 of the end winding support 200 to the upper slot width W1 can be between 2.05 and 2.09. A ratio of the total width W4 of the end winding support 200 to the lower slot width W2 can be between 2.13 and 2.17. A ratio of the end winding lead support width W5 to the shim support width W3 can be between 1.88 and 1.92.

With further reference to FIGS. 1-7, a method of installing the main field wound assembly 110 in the electric generator 100 of FIG. 1 includes inserting the main field wound assembly 110 into the rotor assembly 102 of the electric generator 100. As previously described, the main field wound assembly 110 can include a rotor core assembly 120, a first end winding support 122 coupled to a first end 124 of the rotor core assembly 120, a second end winding support 126 coupled to a second end 128 of the rotor core assembly 120 axially aligned and opposite the first end 124 of the rotor core assembly 120, and a coil of wire 130 repeatedly wound about the first end winding support 122, the rotor core assembly 120, and the second end winding support 126. At least one shim 114 can be installed between the main field wound assembly 110 and a housing 116 of the rotor assembly 102. The method can also include connecting a rotor excitation current source 112 to the coil of wire 130 through the lead coupling ports 208 of the first or second end winding supports 122, 126. With respect to the example of end winding support 200 as an embodiment of the first and/or second end winding supports 122, 126, each of the winding lead supports 202 may further include shim support groove 222 having shim support width W3 and shim support depth D6 to install at least one shim 114.

The terminology used herein is for the purpose of describing particular embodiments only and is not intended to be limiting. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An end winding support for an electric generator, the end winding support comprising:
   a pair of winding lead supports formed on opposite sides of a winding slot and separated by an upper slot width, each of the winding lead supports comprising a winding channel routed between a lead coupling port and the winding slot, wherein each of the winding lead supports further comprises a shim support groove having a shim support width and a shim support depth to install at least one shim between a main field wound assembly and a housing of a rotor assembly of the electric generator, and a ratio of the shim support width to the shim support depth is between 32.94 and 48.34; and
   the winding slot comprising a base support and a pair of alignment members that define a transition between the base support and the winding lead supports, wherein a lower slot width is defined along the base support between the alignment members and a ratio of the upper slot width to the lower slot width is between 1.024 and 1.053.

2. The end winding support of claim 1, wherein the base support further comprises a plurality of grooves aligned along an edge of the base support between the winding lead supports, the grooves establishing a spacing constraint for a first layer of winding.

3. The end winding support of claim 2, wherein the grooves have an arcuate cross-section corresponding to a wire radius of the first layer of winding, and a ratio of a distance between each of the grooves and a radius of each of the grooves is between 1.54 and 2.66.

4. The end winding support of claim 1, wherein the shim support width is defined orthogonal to the upper slot width and the lower slot width.

5. The end winding support of claim 4, wherein a ratio of an end winding lead support width to the shim support width is between 1.88 and 1.92.

6. The end winding support of claim 1, wherein a ratio of a total width of the end support winding to the upper slot width is between 2.05 and 2.09, and a ratio of the total width of the end support winding to the lower slot width is between 2.13 and 2.17.

7. A main field wound assembly for an electric generator, the main field wound assembly comprising:
   a rotor core assembly;
   a first end winding support coupled to a first end of the rotor core assembly;
   a second end winding support coupled to a second end of the rotor core assembly axially aligned and opposite the first end of the rotor core assembly, the first and second end winding supports each comprising a pair of winding lead supports formed on opposite sides of a winding slot and separated by an upper slot width, each of the winding lead supports comprising a winding channel routed between a lead coupling port and the winding slot, the winding slot comprising a base support and a pair of alignment members that define a transition between the base support and the winding lead supports, wherein a lower slot width is defined along the base support between the alignment members and a ratio of the upper slot width to the lower slot width is between 1.024 and 1.053, wherein each of the winding lead supports further comprises a shim support groove having a shim support width and a shim support depth to install the at least one shim between the main field wound assembly and a housing of a rotor assembly of the electric generator, and a ratio of the shim support width to the shim support depth is between 32.94 and 48.34; and
   a coil of wire repeatedly wound about the first end winding support, the rotor core assembly, and the second end winding support.

8. The main field wound assembly of claim 7, wherein the base support of each of the first and second end winding supports further comprises a plurality of grooves aligned along an edge of the base support between the winding lead supports, the grooves establishing a spacing constraint for a first layer of winding the coil of wire.

9. The main field wound assembly of claim 8, wherein the grooves have an arcuate cross-section corresponding to a wire radius of the first layer of winding, and a ratio of a distance between each of the grooves and a radius of each of the grooves is between 1.54 and 2.66 on each of the first and second end winding supports.

10. The main field wound assembly of claim 7, wherein the shim support width is defined orthogonal to the upper slot width and the lower slot width on each of the first and second end winding supports.

11. The main field wound assembly of claim 10, wherein a ratio of an end winding lead support width to the shim support width is between 1.88 and 1.92.

12. The main field wound assembly of claim 7, wherein a ratio of a total width the first end winding support to the upper slot width is between 2.05 and 2.09, and a ratio of the total width of the first end winding support to the lower slot width is between 2.13 and 2.17.

13. A method of installing a main field wound assembly in an electric generator, the method comprising:
   inserting the main field wound assembly into a rotor assembly of the electric generator, the main field wound assembly comprising:
   a rotor core assembly;
   a first end winding support coupled to a first end of the rotor core assembly;
   a second end winding support coupled to a second end of the rotor core assembly axially aligned and opposite the first end of the rotor core assembly, the first and second end winding supports each comprising a pair of winding lead supports formed on opposite sides of a winding slot and separated by an upper slot width, each of the winding lead supports comprising a winding channel routed between a lead coupling port and the winding slot, the winding slot comprising a base support and a pair of alignment members that define a transition between the base support and the winding lead supports, wherein a lower slot width is defined along the base support between the alignment members and a ratio of the upper slot width to the lower slot width is between 1.024 and 1.053, each of the winding lead supports further comprises a shim support groove having a shim support width and a shim support depth to install at least one shim, and a ratio of the shim support width to the shim support depth is between 32.94 and 48.34; and a coil of wire repeatedly wound about the first end winding support, the rotor core assembly, and the second end winding support; and installing the at least one shim in the shim support groove between the main field wound assembly and a housing of the rotor assembly.

14. The method of claim 13, wherein the base support further comprises a plurality of grooves aligned along an edge of the base support between the winding lead supports, the grooves establishing a spacing constraint for a first layer of winding, the grooves having an arcuate cross-section corresponding to a wire radius of the first layer of winding, and further comprising:

connecting a rotor excitation current source to the coil of wire through the lead coupling ports of the first or second end winding supports, and a ratio of a distance between each of the grooves and a radius of each of the grooves is between 1.54 and 2.66 on each of the first and second end winding supports.

15. The method of claim 13, wherein the shim support width is defined orthogonal to the upper slot width and the lower slot width on each of the first and second end winding supports.

16. The method of claim 15, wherein a ratio of an end winding lead support width to the shim support width is between 1.88 and 1.92.

17. The method of claim 13, wherein a ratio of a total width the first end winding support to the upper slot width is between 2.05 and 2.09, and a ratio of the total width of the first end winding support to the lower slot width is between 2.13 and 2.17.

* * * * *